May 14, 1963
T. GAST
3,089,553
METHOD OF AND APPARATUS FOR WEIGHING IN VACUUM
Filed Nov. 29, 1960
2 Sheets-Sheet 1
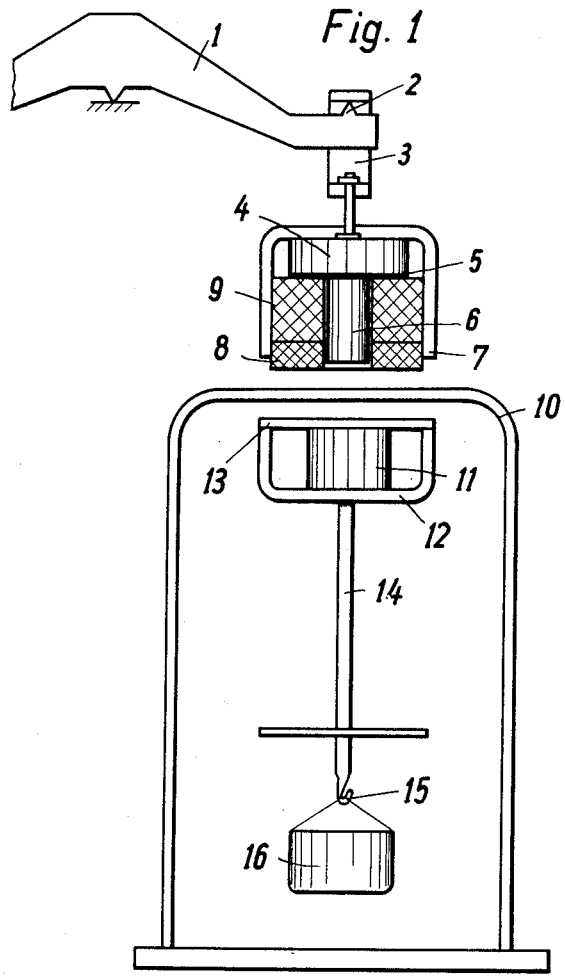
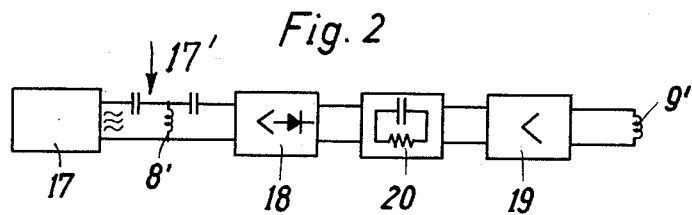
Inventor:
Theodor Gast 3,089,553
**METHOD OF AND APPARATUS FOR
WEIGHING IN VACUUM**
Theodor Gast, Dinslaken, Germany, assignor to Fa.
Sartorius-Werke A.G. (und vormals Gottinger Prazisionswaagenfabrik G.m.b.H.), Gottingen, Germany, a
corporation of Germany
Filed Nov. 29, 1960, Ser. No. 72,469
18 Claims. (Cl. 177—1)

The present invention relates to a method of weighing in closed-up spaces, for instance in testing containers which have been evacuated and filled with a protecting gas, respectively, as well as an apparatus for performing this method.

It was necessary until now for the weighing under these conditions, which are of greatest interest for the technical field and for research, to build into the testing container either the total weighing system or especially developed scales. For such weighing system not only the constructive possibilities were limited, but beyond that it is often very difficult during the production and maintenance of a good high vacuum to comply fully and completely with some circumstances connected therewith. Already during the construction of scales with a carrying load, disposed at the lower limit for a particular application, it is always necessary to operate with gaseous working material or construction elements are found which have air spaces difficult to be pumped out, for instance in the screw connections. Thus it was not possible before to build a fine scale with sufficient carrying load, which could be heated out in vacuum, which, however, is an essential condition for achieving a good high vacuum.

It thus results that to avoid the above-stated drawbacks as the most important condition to be complied with, that the scales are mounted to their greater part outside of the testing container and to leave within the latter only unavoidably necessary parts of the scales. From this reduced requirement of building parts results necessarily a smaller volume of the working material with correspondingly reduced gas releasing surfaces. In addition, these few building parts may be much better selected in regard with their surface reaction in vacuum.

It is, therefore, one object of the present invention to provide a method of and an apparatus for weighing in vacuum and in closed-up spaces, respectively, as testing containers which have been evacuated and/or gas-filled, wherein the suspension on the load side is divided into two mechanically non-connected part suspensions in such manner, that the lower portion, namely the lower suspension, is disposed within the testing container, while the upper portion, namely the upper suspension, is arranged outside of the testing container and wherein both parts are coupled together quasi-rigidly by the pull of magnetic force lines in relation to their relative vertical movement to an end-stabilized status, whereby the suspension system is neutral as to its mechanical forces in outward direction and follows as one unit the oscillations of the beam. In an advantageous manner the lower suspension which swings freely in a closed testing container can control automatically the flux of the magnet system disposed in the upper suspension part in such manner, that the distance, namely the air gap between the two suspension parts remains constant, that means, a stabile swinging condition is set. It can be suitable to obtain the automatic gap control by means of a metal plate secured to the freely swinging lower suspension, which metal plate stimulates inductively the coils in the magnet system of the upper suspension secured to the scale beam. The flux of a control coil disposed on the upper suspension can be controlled herein by an indicator coil disposed on the upper suspension by intermediate arrangement of electronic switching elements.

It is another object of the present invention to provide a method of and apparatus for weighing in vacuum, wherein a light electric system is provided for the control of the flux of a control coil disposed on the upper suspension, which light electric system controls this control coil by means of intermediate electronic means, whereby the light electric system responds to gap changes between the upper and the lower suspension.

It is still another object of the present invention to provide a method of and apparatus for weighing in vacuum, wherein the control of the flux of a control coil disposed on the upper suspension is brought about by means of a condenser system with intermediate electronic switching elements, whereby a condenser-coating of the condenser-system is permanent and a movable condenser-coating is applied to the freely swinging lower suspension in such manner that a change of the capacity causes a corresponding change of the magnetic flux.

The electronic control means in the regulating mechanism contains conventional time members, as, for instance, RC-members, which serve the purpose of suppressing the pendulum oscillations of the gap between the magnetically coupled parts.

It is yet another object of the present invention to provide an apparatus for performing the method as set forth above which apparatus comprises a magnet system disposed on the upper suspension, which magnet system has a magnet with pole-shoe and core and an indicator coil as well as a control coil, and wherein a magnet is disposed on the lower suspension, and which magnet is covered by a metal plate. It is of advantage to insert the indicator coil into a measuring bridge or the like. The indicator coil can be attached to an oscillator and can be connected with the control coil over a rectifier and amplifier, second members and an output amplifier.

It is also a further object of the present invention to provide a method of and apparatus for weighing in vacuum, wherein, in case the magnetic flux is controlled in the control coil by light electric means, a diaphragm may be disposed on the suspension, which diaphragm is arranged in a light ray which extends from the light source to a photo-cell and which diaphragm is movable within the light ray, thereby controlling the light current. The photo-cell can be suitably connected with the control coil by means of the above-described electronic switching means. It can also be suitable to arrange the diaphragm for control of the photo-current on the upper suspension.

If the magnetic flux is controlled over a condenser system, suitably the condenser system, the movable condenser-coating of which is disposed on the freely swinging lower suspension, may be connected with the control coil on the upper suspension by means of electronic control means.

In order to start operation of the scale from the resting position, particular means are provided in the vacuum housing, whereby the lower suspension may have fallen out either completely from the range of the magnetic force or has been pulled in upward direction.

This means may be mechanical, magnetic or electrical means. In order not to interfere with the vacuum, they must be furthermore controlled from the outside. Under circumstances, it is possible to drive this accessory device by means of a servo-motor, which, for instance, can operate with a battery source. It is, however, also possible to provide a vacuum-tight current feeding.

The means designed for starting of the operation of the scales can be formed also simultaneously in such manner that they make possible an arresting of the scales.

With these and other objects in view which will become apparent in the following detailed description, the present invention will be clearly understood in connection with the accompanying drawings, in which:

FIGURE 1 is a vertical section of the suspension means of the scales arranged outside of the testing container and comprising the outer upper suspension means and the lower suspension means disposed within the testing container.

FIG. 2 is a circuit diagram of the automatic, inductive gap control by means of electronic switching elements;

Figure 3:
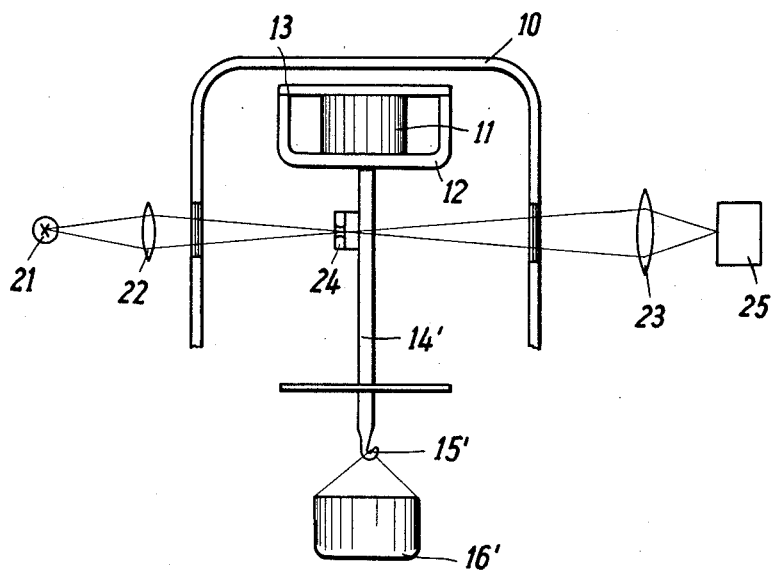
FIG. 3 is a vertical section of a lower suspension means with built-in light barrier.

Referring now to the drawings, and in particular to FIGS. 1 and 2, the apparatus comprises the balance beam 1. The upper suspension means, which in conventional manner comprises the knife edge 2 and the seating 3, is secured to the balance beam and includes the magnet system which consists of the magnet core 4, a pole-shoe 5, the core 6 and the soft-iron pot 7. It further includes the indicator coil 8 and the control coil 9.

The freely swinging lower suspension means, which is disposed in the evacuated and/or gas-filled testing container 10, contains the magnet 11, which is disposed in the pot 12 preferably formed of soft magnetic material. The pot 12 is soldered in a high vacuum-tight manner with the copper plate 13. A rod 14 is secured to the bottom of the pot 12, which rod 14 carries with its hook 15 the scale 16 with the substance to be weighed.

Referring now to FIG. 2 of the drawings, it can be easily ascertained from the circuit indicating the inductive control system, that the indicator coil 8' of the upper suspension, containing the magnet system, is switched into an inductance-measuring bridge or a similar measuring device. An oscillator 17 is provided which functions as generator for the inductivity measuring bridge 17', as is well known. The indicator coil 8' is the measuring coil in the bridge 17. A rectifier-amplifier 18 is connected with the bridge 17' and an output-amplifier 19 is in turn connected with the rectifier-amplifier 18. Time members 20, conventional in the regulating mechanism, are disposed between the rectifier-amplifier 18 and the output-amplifier 19, which time members 20 may be, for instance, RC-members.

Referring now to FIG. 3 of the drawings, the system for the photo-electric control comprises the lamp source 21, the condenser 22 and the objective 23 as well as a diaphragm 24 secured to the rod 14' of the lower suspension. A photo receiver 25 is also shown, disposed behind the objective 23. The parts 21, 22, 23 and 25 are rigidly connected with the upper suspension means, unless they are secured to the housing (not shown) and connect with the upper suspension a second diaphragm disposed within the light beam.

Figure 4:
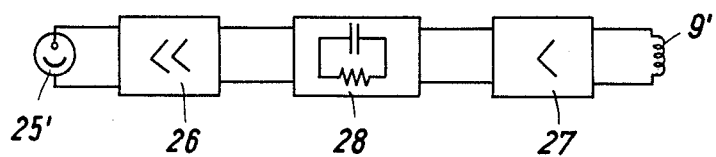
FIG. 4 is a circuit diagram of the automatic photo-electric gap control.

Referring now to FIG. 4 of the drawings, the photo-electric circuit system is disclosed. In particular, a photo-receiver 25' is connected with an amplifier 26 and the latter with an end-amplifier 27 over intermediate time members 28.

The operation of the scale system is as follows:

The suspension means, consisting of two parts are linked to the scale beam 1, which swings freely during the weighing process by known means consisting of the knife edge 2 and the seating 3. The problem, on which the present invention is based, namely to obtain a weight determination through the wall of the testing container, for instance of a vacuum container, is solved by a mechanical separation of the suspension in two separate parts. Instead of the mechanical connection, a magnetic field is provided between the upper and lower suspension means, which magnetic field maintains the two suspension halves in a spacely-defined distance or gap. The usable swinging amplitude of the scale beam 1 equals this distance or air gap, reduced by the thickness of the wall of the testing container 10 which wall is disposed between the upper and the lower suspension means. In order to assure a disturbance-free working, the magnetic field is not permitted to interfere with the vacuum container, that means the latter cannot be made of a ferro-magnetic and para-magnetic or electrically conducting material. As may be easily understood, the total load of the scale which consists of the weight of the lower suspension means and the prevailing weight of the substance arranged in the scale 15 to be weighed must be always smaller than the lifting force created by the magnet system disposed in the upper suspension means.

The stabile position of the lower suspension half required for the practical realization of the present invention is obtained by electronic means and in particular, the indicator coil 8' of the magnet system is disposed for instance in an inductance-measuring bridge in such manner, that upon change of its inductance, in the present case upon narrowing of the copper plate 13 disposed on the lower suspension means, causes an alternating E.M.F. at the output side of the measuring bridge. The alternating E.M.F. is amplified in the rectifier-amplifier 18 and simultaneously rectified and finally fed to the output-amplifier 19, which feeds into the control coil 9' in such manner that it weakens the magnetic field of the upper suspension means upon narrowing of the copper plate 13 towards the indicator coil 8. In order to influence this dynamic process tending to oscillations in the direction of a stationary position, conventional time members 20, for instance RC-members, are disposed between the oscillator 17 and the output-amplifier 19. Provided that the poles of the magnetic fields have been arranged correctly, the direct voltage-signal causes a direct control of the magnetic field over the final output-amplifier 19 with the result that the lower suspension means is maintained in suspension.

If the distance or gap control is to be performed by photo-electrical means, a light ray originates from the lamp 21 and reaches over a condenser 22 and an optic 23 to a light electric cell of the photo-amplifier 25. This photo-current is controlled by the diaphragm 24 secured to the rod 14' of the lower suspension means. The electrical signal of the photo-cell 25 is finally amplified in an amplifier 26 and upon further amplification in the amplifier 27 used for the control of the coil 9. It is here of importance that the total optical system, with the exception of the diaphragm 24, is rigidly connected with the upper suspension means, or at least a second diaphragm, secured to the upper suspension means, is arranged within the path of the rays.

If a condenser system, that means a variable capacity, is used as an indicator, which condenser system is disposed outside of the testing container on the upper suspension means, the described measuring device remains substantially unchanged, however, it will be necessary to transform the measuring device for the inductance in an otherwise analogous capacity-measuring device.

While I have disclosed several embodiments of the present invention, it is to be understood that these embodiments are given by example only and not in a limiting sense, the scope of the present invention being determined by the objects and the claims.

I claim:

1. A method of weighing in a closed space, as an evacuated or gas-filled testing container by means of scales including a beam and upper and lower suspension means mechanically disconnected from each other, said upper suspension means being disposed outside of said testing container and said lower suspension means being disposed within said testing container, comprising the steps of generating magnetic flux lines between said upper and lower suspension means with an air gap between the latter in order to couple together quasi-rigidly the latter by the pulling force of said magnetic flux lines in connection with their vertical relative movement into an end-stabilized condition, whereby said suspension means are neutral outwardly as to their mechanical forces and follow as a single unit the oscillations of said beam, and maintaining said air gap between said suspension means constant.

2. The method as set forth in claim 1, wherein said lower suspension means include inductance means, and the latter effecting the flux generating means of said upper suspension means.

3. The method, as set forth in claim 1, which includes the step of generating said magnetic flux lines in a control coil by using an indicator coil with intermediate electronic means, both said coils being disposed on said upper suspension means.

4. The method, as set forth in claim 2, which includes the step of controlling said magnetic flux lines in a control coil by a light-electric system with intermediate electronic means, said light-electric system responding to gap-changes between said upper suspension means and said lower suspension means.

5. The method, as set forth in claim 1, which includes the step of forming said magnetic flux lines in a control coil disposed on said upper suspension means from a condenser-system with intermediate electronic means, said condenser-system including a movable condenser-coating secured to said freely swinging lower suspension means in such manner that a change of its capacity causes a corresponding change of said magnetic flux lines.

6. An apparatus for the weighing in a closed space, as an evacuated or gas-filled testing container, comprising a pair of scales including a beam, the load-side of said scales comprising an upper suspension means and a lower suspension means mechanically disconnected from each other, said upper suspension means being disposed outside of and said lower suspension means inside of said testing container, a magnet-system disposed on said upper suspension means and including a first magnet having a pole-shoe, a core, an inductance-measuring bridge including an indicator coil, and a control coil, intermediate electronic means electrically connecting said indicator coil and said control coil, and a second magnet disposed on said lower suspension means, and a metal plate covering said second magnet, whereby the change of the inductance of said indicator coil causes an alternating E.M.F. at the output side of said inductance-measuring bridge.

7. The apparatus, as set forth in claim 6, which includes a first soft-iron pot receiving said magnet-system and a second soft-iron pot receiving said second magnet.

8. The apparatus, as set forth in claim 6, wherein said intermediate electric means comprises an oscillator, a rectifier-amplifier, time-members, and an output-amplifier, and said indicator coil is fed by said oscillator.

9. The apparatus, as set forth in claim 6, which includes a light-electric system controlling said magnetic flux lines of said control coil with said intermediate electronic means, and a diaphragm, said light electric system including a lamp and a photo-cell receiving a light beam from said lamp, and said diaphragm being movable within said light beam.

10. The apparatus, as set forth in claim 9, which includes a first amplifier, time-members and a second amplifier, and said photo-cell is connected with said control coil over said first amplifier, said time-members and said second amplifier.

11. The apparatus, as set forth in claim 9, wherein said diaphragm is secured to said lower suspension means.

12. The apparatus, as set forth in claim 9, wherein said diaphragm for the control of the photo-current is secured to said upper suspension means.

13. The apparatus, as set forth in claim 6, which includes a condenser system performing said magnetic flux lines of said control coil with intermediate electronic means, said condenser-system including a movable condenser-coating disposed on said lower suspension means, so that a change of the capacity causes a corresponding change of said magnetic flux lines.

14. The apparatus, as set forth in claim 13, which includes an amplifier and time-members, and said condenser is connected with said control coil over said amplifier and said time-members.

15. An apparatus for weighing in a closed space, as an evacuated or gas-filled testing container, comprising a pair of scales including a beam, the load-side of said scales comprising an upper suspension means and a lower suspension means mechanically disconnected from each other, said upper suspension means being disposed outside of and said lower suspension means being disposed inside of said testing container to form an air gap therebetween, magnetic means for coupling together quasi-rigidly said upper and lower suspension means and for maintaining said suspension means neutral as to their mechanical forces to follow as a single unit the oscillations of said beam, and said magnetic means including means for maintaining constant said air gap.

16. The apparatus, as set forth in claim 15, wherein said means for maintaining constant said air gap comprises means disposed in said lower suspension means for controlling automatically the magnetic flux lines emanating from said upper suspension means.

17. The apparatus, as set forth in claim 16, wherein said control means comprises a metal plate, said magnetic means disposed in said upper suspension means includes coils, and said metal plate operates inductively with said coils, to maintain said constant air gap.

18. The apparatus, as set forth in claim 17, wherein one of said coils is a control coil and another of said coils is an indicator coil, and said control means includes electronic means, and the magnetic flux of said control coil is controlled by said indicator coil by means of said electronic means.

References Cited in the file of this patent
UNITED STATES PATENTS

| | | |
|---|---|---|
| 2,541,862 | Cunningham | Feb. 13, 1951 |
| 2,675,222 | Clark | Apr. 13, 1954 |
| 2,946,930 | Gilbert | July 26, 1960 |